3,511,882
PRODUCTS OF REACTION OF POLYOXYALKYLENE ALCOHOLS AND DI-GLYCIDYL ETHERS OF BIS-PHENOL COMPOUNDS
Virgil L. Seale, Billy Ray Moreland, and James Derwin, Houston, Tex., assignors to Nalco Chemical Company, Chicago, Ill., a corporation of Delaware
No Drawing. Original application Mar. 6, 1964, Ser. No. 350,112, now Patent No. 3,383,326, dated May 14, 1968. Divided and this application Feb. 26, 1968, Ser. No. 707,992
Int. Cl. C07c 43/22
U.S. Cl. 260—613                          5 Claims

ABSTRACT OF THE DISCLOSURE

Compositions of matter, and processes of breaking petroleum emulsions of the water-in-oil type therewith, which said compositions comprise a water insoluble, at least partially oil soluble product of the reaction of an epoxide of a polyphenol and an adduct obtained by reacting ethylene oxide with a higher alkylene oxide adduct of a compound from the group consisting of hydroxyhydrocarbyl compounds and hydroxyhydrocarbylether compounds, said hydroxyhydrocarbyl compounds and hydroxyhydrocarbylether compounds, said hydroxyhydrocarbyl compounds and hydroxyhydrocarbylether compounds containing up to 12 carbon atoms and 1 to 3 hydroxyhydrocarbylether compounds containing up to 12 carbon atoms and 1 to 3 hydroxyl groups, and the oxyalkylene groups of said higher alkylene oxide adduct being from the group consisting of oxypropylene, oxybutylene and mixtures of oxypropylene and oxybutylene, said diglycidyl ether being a member of the group consisting of diphenyldiglycidyl ether and a diglycidyl ether of diphenylmethane, with the remaining substituents on the methane carbon being selected from the group consisting of hydrogen and methyl, said compound constituting 1–15% by weight of said higher alkylene oxide adduct, the reacted ethylene oxide being in the range of 0.2 to 2 moles per hydroxyl equivalent of said higher alkylene oxide adduct, and the proportion of said diglycidyl ether in said copolymer being 12–18 parts of said diglycidyl ether per 100 parts of the oxyethylated higher alkylene oxide adduct.

RELATED APPLICATION

This application is a division of our copending application Ser. No. 350,112, filed Mar. 6, 1964, and now Pat. No. 3,383,326.

BACKGROUND OF INVENTION

This invention, in general, relates to new compositions of matter and their use in the treatment of emulsions of mineral oils and water, such as petroleum emulsions commonly encountered in the production, handling and refining of crude mineral oil.

Petroleum emulsions are, in general, of the water-in-oil type wherein oil acts as the continuous phase for dispersal of the finely-divided particles of naturally occurring waters or brines. These emulsions are often extremely stable and will not resolve into the oil and water components even on long standing. The emulsions obtained from producing wells and from the bottom of crude oil storage tanks are commonly referred to as "cut oil," "emulsified oil," "bottom settlings" and "B.S." It is also to be understood that water-in-oil emulsions may occur artificially, resulting from any one or more of numerous operations encountered in various industries.

An object of the invention is to provide new compositions which are effective in resolving water-in-petroleum oil emulsions into their component parts of oil and water or brine.

Another object is to provide novel compositions which are surface-active in order to enable their use as demulsifiers or for such uses where surface-active characteristics are necessary or desirable. Other objects will appear hereinafter.

DESCRIPTION OF INVENTION

In accordance with the invention, the crude oil demulsifying agents are the water insoluble, at least partially oil soluble product of the reaction of an epoxide of a polyphenol, preferably a diglycidyl ether of bis-phenol A, and an adduct obtained by reacting ethylene oxide with a higher alkylene oxide adduct of a hydroxy hydrocarbyl compound or a hydroxy hydrocarbyl ether containing up to twelve carbon atoms and one to three hydroxyl groups wherein the oxyalkylene groups are oxypropylene (preferably 1,2-oxypropylene) oxybutylene (preferably 1,2-oxybutylene), or mixtures of oxypropylene and oxybutylene.

In making these compositions, a first adduct is made by adding an alkylene oxide, such as, for example, 1,2-butylene oxide, or 1,2-propylene oxide, or mixtures thereof, to a suitable monohydric, dihydric or trihydric compound, such as, for example normal butyl alcohol secondary butyl alcohol, normal propanol, isopropanol, butanol-1, the butyl ether of diethylene glycol, phenol, ortho-, meta-, or para-isopropyl phenol, ortho-, meta-, or para-butyl phenol, ortho, meta-, or para-amyl phenol, propylene glycol, 1,2-propylene glycol, 1,3-butylene glycol, 1,2,6-hexamethylenetriol, or glycerine. Thereafter ethylene oxide is added to the first adduct to form a second adduct which is an oxyethylated adduct in which the proportion of primary hydroxyl groups to secondary hydroxyl groups is such as to give the desired product when reacted with an epoxide of a polyphenol.

The reaction between the oxyethylated adduct and the epoxide of the polyphenol is carried out in the presence of a solvent in which the oxyethylated adduct, the epoxide of the polyphenol, and copolymers of oxyethylated adduct and the epoxide of the polyphenol are soluble. The quantity of the solvent should be such that the rate of reaction of oxyethylated adduct with the epoxide of the polyphenol and the self polymerization of the epoxide of the polyphenol will result in the desired product. Solvents which have been found to be particularly useful are benzene, toluene, and methylethyl ketone. Xylene has been used but is less satisfactory than the other solvents.

The proportions of the various reactants are subject to variation. The starting monohydroxy, dihydroxy or trihydroxy compound acts as an acceptor for the oxyalkylation material, e.g., 1,2-propylene oxide or 1,2-butylene oxide, and this acceptor forms a minor proportion of the first adduct. It necessarily follows that the oxyalkylation material, such as, for example, 1,2-propylene oxide or 1,2-butylene oxide, forms a major proportion of the first adduct. Usually, the acceptor is not more than 15% by weight of the first adduct and can be as low as 1% or 2% by weight of the first adduct.

In the second adduct which is formed by adding ethylene oxide to the first adduct, the optimum quantity of ethylene oxide added will depend upon the chemical constitution of the first adduct. If the oxyalkylene groups present in the first adduct are primarily oxybutylene groups, up to two moles of ethylene oxide can be added per mole of hydroxyl (OH—) in the first adduct, with the preferred range, where the first adduct is a polybutylene glycol, being within the range of 0.7 to 1.1 mole of ethylene oxide per mole of hydroxyl groups in the polybutylene glycol.

If the first adduct consists primarily of oxypropylene groups, the amount of ethylene oxide added preferably does not exceed 0.8 mole per mole of hydroxyl groups in the first adduct and a preferred range is 0.4 to 0.8 mole of ethylene oxide per mole of hydroxyl group in the first adduct.

If the first adduct is made by oxyalkylating a triol or other trihydroxy compound, it is desirable that no more than 0.5 mole of ethylene oxide be added per mole of hydroxyl groups in the first adduct.

It will be seen, therefore, that oxyethylene groups comprise a minor proportion, usually not exceeding 15% by weight, and in most cases, below 10% by weight of the second adduct. In terms of the amount of ethylene oxide per hydroxyl equivalent, the range will vary from about 0.2 mole of ethylene oxide to 2 moles of ethylene oxide per hydroxyl equivalent (grams of product that would contain 17 grams of hydroxyl). In most cases, the quantity of ethylene oxide per hydroxyl equivalent will not exceed one mole.

On a weight basis the epoxide of the polyphenol will normally constitute a minor proportion of the final product. Thus, it is preferable to react about 12 to 18 parts by weight of the epoxide of the polyphenol with 100 parts by weight of the second adduct.

The extent of oxyalkylation in the preparation of the first adduct will vary but is preferably such that the first adduct has a minimum molecular weight of 500 where it consists primarily of oxybutylene groups and a minimum molecular weight of 1000 where it consists primarily of oxypropylene groups. In general, a maximum molecular weight of 4000 is satisfactory in either case. The molecular weight range of 500 to 4000 also applies where both oxypropylene and oxybutylene groups are present in the first adduct.

In the preferred compositions of the invention the epoxide equivalent of the epoxide of the polyphenol is preferably limited to a minimum of 145 and a maximum below 250. The epoxide equivalent is defined as the number of grams of material containing one epoxide group. Thus, a suitable starting material is a substance known as Epon 828 which is a commercial epoxidized dihydroxy-diphenyldimethylmethane having an average epoxide equivalent of 175 to 210. Other similar commercial products are available and can be employed as the epoxide of the polynuclear phenol. These products for the most part consist principally of the diglycidyl ether of diphenyldimethylmethane. The diglycidyl ether of diphenylmonomethylmethane and the diphenyldiglycidyl ether can be employed as reactants.

The conditions of reaction in forming the first adduct will vary depending upon whether butylene oxide or propylene oxide is employed in the oxyalkylation. In general, where butylene oxide is employed, the temperature will be within the range of 110° C. to 120° C. Where propylene oxide is employed the temperature will be within the range of 120° C. to 130° C.

In forming the second adduct where ethylene oxide is employed the temperature range will usually be from 150° C. to 160° C.

In forming the first adduct a small amount of alkali, as, for example, ground caustic potash, is employed as a catalyst. The amount employed will usually be within the range of 0.2% to 0.35% by weight of the adduct. This catalyst is also present during the formation of the second adduct.

Superatmospheric pressures are employed in forming the second adduct in accordance with well known oxyethylation procedures.

In forming the final product by reaction of the second adduct with the epoxide of the polyphenol, the quantity of solvent, for example, toluene, is usually within the range of 25 to 75 parts of solvent per 100 parts of the second adduct per 12 to 18 parts of the epoxide of the polyphenol, all calculated by weight. In most cases, good results are obtained by employing about 50 parts by weight of solvent per 100 parts by weight of the second adduct per 16 parts by weight of the epoxide of the polyphenol.

The reaction between the second adduct and the epoxide of the polyphenol is preferably carried out in three temperature stages for the oxyethylated adduct of polybutylene glycol and four temperature stages for the oxyethylated adduct of polypropylene glycol. In the first stage the reactants are digested at around 100–110° C. At this temperature solvents such as toluene which boils around 110° C. remain in the reaction mixture. In the second stage the heat is increased to a temperature around 130–135° C. for the oxyethylated adduct of polypropylene glycol and 160° C. to 170° C. for the oxyethylated adduct of polybutylene glycol. During this stage solvents, such as toluene, are at least partially removed and the viscosity of the reaction mass increases rapidly. After the mixture has become viscous, it is preferable to add a suitable higher boiling hydrocarbon solvent, such as $SO_2$ extract, which boils in the range of about 190° C. to 235° C. After the addition of the $SO_2$ extract, the mixture containing the oxyethylated adduct of polypropylene glycol is heated to a temperature around 160° C. to 170° C. After further reaction at a temperature of 160°–170° C. the temperature is raised to about 220° C. During the period of heating to this temperature lower boiling solvents such as toluene are removed from the reaction mixture. These lower boiling solvents are collected and can be returned to the product or used for additional reactions. Usually about 60% of solvents, such as toluene, are removed at a temperature of 135° C.

The product is normally recovered as a solvent solution which is opalescent or translucent. If the second adduct contains too much ethylene oxide (contains a higher proportion of primary hydroxyl groups to secondary hydroxyl groups) no solids form, and a clean, clear solution results which is very viscous for the lower molecular weight polyglycols and which is a gel for the higher molecular weight polyglycols and the product is a poor demulsifier for crude oil petroleum emulsions. If the second adduct contains too little ethylene oxide (contains a lower proportion of primary hydroxyl groups to secondary hydroxyl groups) large amounts of insoluble material is formed and there is little or no increase in viscosity and the product is a poor demulsifier for crude oil petroleum emulsions. If the second adduct contains ethylene oxide within the limits specified, small amounts of insoluble material is formed at the lower temperature, 100° C. and thickening results at the higher temperature, 135° C. for the oxyethylated adduct of polypropylene glycol and 165° CC. for the oxyethylated adduct of polybutylene glycol. This results in a solvent solution which is turbid. This turbidity can be noted when the reactants are heated to a temperature of 100° C.

The amount of ethylene oxide (the proportion of primary hydroxyl groups to secondary hydroxyl groups) is extremely important. Since the epoxides of phenols or polyphenols are more reactive toward primary hydroxyl groups than secondary hydroxyl groups at about 100° C., the proportion of primary hydroxyl groups to secondary hydroxyl groups determine the type of copolymer formed when the oxyethylated adduct and the epoxide of polyphenol are reacted.

The final product is an excellent demulsifier for crude oil petroleum emulsions, especially certain types of crude oil petroleum emulsions which do not break readily. This product can be used as such but it is usually preferable to blend it with more highly hydroxylated adducts which are effective to increase the water release in the treatment of a water-in-oil petroleum emulsion. Thus, the demulsifier can contain, for example, 40–85% by weight of a solvent solution of a product of the present invention and 60–15% by weight of an auxiliary substance to enhance the water release. Of the 40–85% portion, approximately 18–22% is preferably an active material prepared as herein described if the first adduct is primarily a polybutylene glycol, and approximately 28–32% is preferably an active material prepared as herein described if the first adduct is primarily a polypropylene glycol, the remainder in each case being a solvent such as, for example, SO₂ extract or a mixture of SO₂ extract and toluene.

The preferred composition can be described by the general formula:

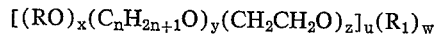

$$[(RO)_x(C_nH_{2n+1}O)_y(CH_2CH_2O)_z]_u(R_1)_w$$

where R is a radical from the group consisting of hydrocarbon radicals and hydrogen ether radicals containing up to 12 carbon atoms; $R_1$ is the residue of an epoxide of a polyphenol having an epoxide equivalent of at least 145 and below 250; $x$ is 1 to 3; $n$ is 3 to 4; $y$ is 17 to 68 when $n$ is 3 and 7 to 56 when $n$ is 4; $z$ is 0.7 to 1.1 when $n$ is 4 and $x$ is 1 to 2; $z$ is 0.4 to 0.8 when $n$ is 3 and $x$ is 1 to 2; $z$ is 0.2 to 0.5 when $n$ is 3 to 4 and $x$ is 3; $u$ is 3 to 5; and $w$ is 2 to 4.

In terms of weight percentages, the preferred compositions can also be described as the reaction product of an epoxide of a polyphenol having an epoxide equivalent of at least 145 but less than 250 with an oxyethylated adduct consisting of oxybutylene groups or oxypropylene groups added to an acceptor having one, two or three replaceable hydrogen atoms in hydroxyl groups from the class consisting of hydroxy hydrocarbyl compounds and hydroxy hydrocarbyl ether compounds containing up to twelve carbon atoms, the proportion of oxyethylene groups being 0.4% to 15%, the proportion of oxyalkylene polyphenol groups being 10% to 20%, the proportion of acceptor groups being 1% to 15% and the remainder being oxypropylene and/or oxybutylene groups.

One of the preferred products of the invention can be described as a copolymer of a diglycidyl ether of bis-phenol-A with an ethylene oxide adduct of a 1,2-butylene oxide adduct of a 1,3-butylene glycol wherein the 1,2-butylene oxide adduct has a molecular weight of 500 to 4000, the weight ratio of ethylene oxide to said 1,2-butylene oxide adduct is within the range of 1:19 to 3:17 and the weight ratio of said diglycidyl ether of bis-phenol-A to said ethylene oxide adduct is within the range of 1:10 to 1:5.

Another preferred product of the invention can be described as a copolymer of a diglycidyl ether of bis-phenol-A with an ethylene oxide adduct of a 1,2-propylene oxide adduct of di-1,2-propylene glycol wherein the 1,2-propylene oxide adduct has a molecular weight of 1000 to 4000, the weight ratio of ethylene oxide to said 1,2-propylene oxide adduct is within the range of 1:100 to 1:19 and the weight ratio of said diglycidyl ether of bis-phenol-A to said ethylene oxide adduct is within the range of 1:10 to 1:5.

The preferred products are further characterized by the fact that their solvent solution, for example, in toluene or SO₂ extract, are turbid which indicates the presence of copolymers of the oxyethylated adduct and the epoxide of the polyphenol having such a high proportion of the epoxide of the polyphenol that the material is insoluble and having minor amounts of a self-polymer of the epoxide of the polyphenol. The invention, therefore, contemplates mixtures as well as pure products and includes solvent solutions or dispersions of these products.

Sulfur dioxide extract is a by-product from the Edeleneau process of petroleum refining in which the undesirable fractions are removed by extraction with liquid SO₂. After removal of the sulfur dioxide a mixture of hydrocarbons substantially aromatic in character remains and is designated in the trade as sulfur dioxide extract or SO₂ extract. In addition to sulfur dioxide extract, toluene, benzene and methylethyl ketone, the invention contemplates the use of other solvents in which the products are chemically inert.

ILLUSTRATIVE EMBODIMENTS

The invention will be further illustrated but is not limited by the following examples in which the quantities are stated in parts by weight unless otherwise indicated.

PREPARATION OF FIRST AND SECOND ADDUCTS

Example A

To an autoclave equipped with a means of mechanical stirring, heating, and cooling, 10.8 parts of 1,3-butylene glycol and 0.25 part potassium hydroxide were added. The contents of the autoclave was heated to 110° C. At this temperature, 1,2-butylene oxide was slowly introduced from a transfer bomb which contained 75.4 parts of 1,2-butylene oxide; cooling was applied during the addition to maintain the temperature below 115° C. with a pressure of 50–60 p.s.i. Approximately two hours were required to introduce the 1,2-butylene oxide; the temperature was then allowed to rise to 150° C. The reaction mass was maintained at this higher temperature for four hours to insure that the unreacted 1,2-butylene oxide was at a minimum. 13.8 parts of ethylene oxide was added from a transfer bomb at such a rate that the temperature was maintained between 150–160° C. with a pressure of 60–75 p.s.i. After all of the ethylene oxide had been added, the temperature was held at 150° C. for an additional hour to complete the reaction. The molecular weight of the final product was approximately 600.

Example B

To similar equipment as used in Example A, 7.2 parts of 1,3-butylene glycol and 0.25 part potassium hydroxide were added and heated to 110° C. 83.7 parts of 1,2-butylene oxide and 9.1 parts ethylene oxide were added separately using the same procedure as in Example A. The molecular weight of the final product was approximately 1000.

Example C

To similar equipment as used in Example A, 4.5 parts of 1,3-butylene glycol and 0.25 part potassium hydroxide were added and heated to 110° C. 88.9 parts of 1,2-butylene oxide and 6.6 parts ethylene oxide were added separately using the same procedure as in Example A. The molecular weight of the final product was approximately 1370.

Example D

To similar equipment as used in Example A, 4.1 parts of 1,3-butylene glycol and 0.25 part potassium hydroxide were added and heated to 110° C. 90.8 parts of 1,2-butylene oxide and 5.1 parts ethylene oxide were added separately using the same procedure as in Example A. The molecular weight of the final product was approximately 1760.

Example E

To an autoclave equipped with a means of mechanical stirring, heating and cooling, 4.7 parts of dipropylene glycol and 0.25 part potassium hydroxide were added. The contents of the autoclave was heated to 125° C. At this temperature 1,2-propylene oxide was slowly introduced from a transfer bomb which contained 92.8 parts of 1,2-propylene oxide; cooling was applied during the addition to maintain the temperature below 130° C. with a pressure of 60–75 p.s.i. Approximately two hours were required to introduce the 1,2-propylene oxide; the reaction mass was maintained at 130° C. for four hours to insure that the unreacted 1,2-propylene oxide was at a minimum. 2.5 parts of ethylene oxide was added from a transfer bomb at such a rate that the temperature was maintained between 150° C. to 160° C. with a pressure of 60–75 p.s.i. After all of the ethylene oxide had been added, the temperature was held at 150° C. for an additional hour to complete the reaction. The molecular weight of the final product was approximately 1950.

Example F

To similar equipment as used in Example E, 7.2 parts of dipropylene glycol and 0.25 part potassium hydroxide were added and heated to 125° C. 90.0 parts of 1,2-propylene oxide and 2.8 parts ethylene oxide were added separately using the same procedure as in Example E. The molecular weight of the final product was approximately 1470.

Example G

To similar equipment as used in Example E, 3.0 parts of di-1,2-propylene glycol and 0.25 part potassium hydroxide were added and heated to 125° C. 95.4 parts of 1,2-propylene oxide and 1.6 parts ethylene oxide were added separately using the same procedure as in Example E. The molecular weight of this product was approximately 2800.

PREPARATION OF COPOLYMER OF EPOXIDE OF POLYPHENOL

Example H

One hundred parts of the polyglycol prepared in Example A, 16 parts of the diglycidyl ether of bis-phenol-A, and 50 parts of toluene were placed in a three necked flask equipped with a means of mechanical stirring and heating. The mixture was heated to 100° C. and held at that temperature for one hour; the heat again was increased and enough toluene removed so that the remaining mixture refluxed at 165° C. At this stage of the reaction, the viscosity of the reaction mass increased rapidly. After the mixture had become quite viscous, 75 parts of a suitable hydrocarbon solvent, such as $SO_2$ extract, was added. The temperature was maintained at 165° C., for 1½ hours; during the last hour of this time a slow increase in viscosity was noted; however, no additional solvent was added. After 1½ hours at 165° C. the mixture was heated to 220° C. and held for 30 minutes. During heating to 220° C. all of the toluene was removed. Upon cooling, the toluene which had been removed together with 390 parts of $SO_2$ extract was added.

Example I

To similar equipment as used in Example H, 100 parts of the polyglycol prepared in Example D, 12 parts of the diglycidyl ether of bis-phenol-A, and 50 parts of toluene were added. The reaction was completed using the same procedure as in Example H. The behavior of this reaction mixture was identical to that in Example H in every respect except the rates of thickening differed. Upon cooling, the toluene which had been removed together with 390 parts of $SO_2$ extract was added.

Example J

To similar equipment as used in Example H, 100 parts of the polyglycol prepared in Example D, 19 parts of the diglycidyl ether of bis-phenol-A, and 50 parts of toluene were added. The reaction was completed using the same procedure as in Example H. The behavior of this reaction mixture was identical to that in Example H in every respect except the rates of thickening differed. Upon cooling the toluene which had been removed together with 390 parts of $SO_2$ extract was added.

Example K

To similar equipment as used in Example H, 100 parts of the polyglycol prepared in Example D, 16 parts of the diglycidyl ether of bis-phenol-A, and 50 parts of benzene were added. The reaction was completed using the same procedure as in Example H. The behavior of this reaction mixture was identical to that in Example H in every respect except the rates of thickening differed. Upon cooling, the benzene which had been removed together with 390 parts of $SO_2$ extract was added.

Example L

To similar equipment as used in Example H, 100 parts of the polyglycol prepared in Example D, 16 parts of the diglycidyl ether of bis-phenol-A, and 50 parts of methylethyl ketone were added. The reaction was completed using the same procedure as in Example H. The behavior of this reaction mixture was identical to that in Example H in every respect except the rates of thickening differed. Upon cooling, the methylethyl ketone which had been removed together with 390 parts of $SO_2$ extract was added.

Example M

To similar equipment as used in Example H, 100 parts of the polyglycol prepared in Example B, 16 parts of the diglycidyl ether of bis-phenol-A, and 50 parts of toluene were added. The reaction was completed using the same procedure as in Example H. The behavior of this reaction mixture was identical to that in Example H in every respect except the rates of thickening differed. Upon cooling, the toluene which had been removed together with 390 parts of $SO_2$ extract was added.

Example N

To similar equipment as used in Example H, 100 parts of polyglycol prepared in Example C, 16 parts of the diglycidyl ether of bis-phenol-A, and 50 parts of toluene were added. The reaction was completed using the same procedure as in Example H. The behavior of this reaction mixture was identical to that in Example H in every respect except the rates of thickening differed. Upon cooling, the toluene which had been removed together with 390 parts of $SO_2$ extract was added.

Example O

To similar equipment as used in Example H, 100 parts of the polyglycol prepared in Example D, 16 parts of the diglycidyl ether of bis-phenol-A, and 50 parts of toluene were added. The reaction was completed using the same procedure as in Example H. The behavior of this reaction mixture was identical to that in Example H in every respect except the rates of thickening differed. Upon cooling the toluene which had been removed together with 390 parts of $SO_2$ extract was added.

Example P

One hundred parts of the polyglycol prepared in Example E, 16 parts of the diglycidyl ether of bis-phenol-A, and 50 parts of toluene were placed in a three necked flask equipped with a means of mechanical stirring and heating. The mixture was heated to 100° C. and held at that temperature for one hour; the heat was again increased until the mixture refluxed at 135° C. At this stage of the reaction the viscosity of the reaction mass increased rapidly. After the mixture had become quite viscous, 75 parts of a suitable hydrocarbon solvent, such as $SO_2$ extract, was added. Again the heat was increased until the mixture refluxed at 170° C. The viscosity of the reaction mass increased slowly. When the mixture had become very viscous, a second addition of 75 parts of $SO_2$ extract was made. The temperature was maintained at 170° C. for 1½ hours; during the last hour of this time a slow increase in viscosity was noted; however, no additional solvent was added. After 1½ hours at 170° C., the mixture was heated to 220° C. and held for 30 minutes. During heating to 220° C. all of the toluene was removed. Upon cooling, the toluene which had been removed together with 75 parts of $SO_2$ extract was added.

Example Q

To similar equipment as used in Example P, 100 parts of the polyglycol prepared in Example E, 12 parts of the diglycidyl ether of bis-phenol-A, and 50 parts toluene were added. The reaction was completed using the same procedure as in Example P. The behavior of this reaction mixture was identical to that in Example P in every respect except the rates of thickening differed. Upon cooling, the toluene which had been removed together with 75 parts of SO₂ extract was added.

Example R

To similar equipment as used in Example P, 100 parts of the polyclycol prepared in Example E, 18 parts of the diglycidyl ether of bis-phenol-A, and 50 parts toluene were added. The reaction was completed using the same procedure as in Example P. The behavior of this reaction mixture was identical to that in Example P in every respect except the rates of thickening differed. Upon cooling, the toluene which had been removed together with 75 parts of SO₂ extract was added.

Example S

To similar equipment as used in Example P, 100 parts of the polyglycol prepared in Example E, 16 parts of the diglycidyl ether of bis-phenol-A, and 50 parts benzene were added. The reaction was completed using the same procedure as in Example P. The behavior of this reaction mixture was identical to that in Example P in every respect except the rates of thickening differed. Upon cooling, the benzene which had been removed together with 75 parts of SO₂ extract was added.

Example T

To similar equipment as used in Example P, 100 parts of the polyglycol prepared in Example E, 16 parts of the diglycidyl ether of bis-phenol-A, and 50 parts of methylethyl ketone were added. The reaction was completed using the same procedure as in Example P. The behavior of this reaction mixture was identical to that in Example P in every respect except the rates of thickening differed. Upon cooling, the methylethyl ketone which had been removed together with 75 parts of SO₂ extract was added.

Example U

To similar equipment as used in Example P, 100 parts of the polyglycol prepared in Example F, 16 parts of the diglycidyl ether of bis-phenol-A, and 50 parts toluene were added. The reaction was completed using the same procedure as in Example P. The behavior of this reaction mixture was identical to that in Example P in every respect except the rates of thickening differed. Upon cooling, the toluene which had been removed together with 75 parts of SO₂ extract was added.

Example V

To similar equipment as used in Example P, 100 parts of the polyglycol prepared in Example G, 16 parts of the diglycidyl ether of bis-phenol-A, and 50 parts toluene were added. The reaction was completed using the same procedure as in Example P. The behavior of this reaction mixture was identical to that in Example P in every respect except the rates of thickening differed. Upon cooling, the toluene which had been removed together with 75 parts of SO₂ extract was added.

In the foregoing examples, the final adducts of Examples A to D are polybutylene glycols with about one mole of ethylene oxide per hydroxyl. In Examples E to G the final adducts are polypropylene glycols with about 0.5 mole of ethylene oxide per hydroxyl.

*Demulsification.*—The compositions of this invention are surface active and are particularly suitable for the demulsification of crude oil emulsions. Demulsification is achieved by mixing the demulsifying agents of this invention, at a ratio in the approximate range of one part of the demulsifying agent to 2,000–50,000 parts of the emulsion, and thereafter allowing the emulsion to remain in a relatively quiescent state during which separation of the oil and water occurs. The demulsifying agents of this invention may be used in conjunction with other demulsifying agents from classes such as petroleum sulfonate type, of which naphthalene sulfonic acid is an example, the modified fatty acid type, the amine modified oxyalkylated phenol-formaldehyde type, and others.

The effectiveness of the compositions of this invention as demulsifying agents is illustrated in the following tests and data.

*Bottle testing of crude oil emulsions.*—The bottle testing or crude oil emulsions is conducted according to the following procedure: Fresh samples of the emulsion-breaking chemicals in organic solvent solution are prepared in 10% solutions. These solutions are made by accurately diluting 10 milliliters of the emulsion breaking chemicals in 90 milliliters of a mixture of equal parts of anhydrous isopropyl alcohol and an aromatic hydrocarbon such xylene. The mixture is agitated well until the emulsion breaking chemical is completely dissolved.

The equipment for running the crude oil emulsion breaking test, in addition to the foregoing 10% solutions, includes a set of six ounce graduated prescription bottles, a funnel, a graduated 0.2 milliliter pipette, a thief pipette, a centrifuge, centrifuge tubes and a thermometer. The graduated prescription bottles are filled to the 100 milliliter mark with the crude oil emulsion to be tested, preferably a sample which has been recently collected. If there is any free water in the crude oil emulsion sample collected, it is bled off before the bottles are filled. Each bottle is inverted several times with the bottle capped so that the bottle will be coated with an emulsion film.

By means of the 0.2 milliliter pipette, the prescribed volume of the 10% solution of the emulsion breaking chemical is added to the emulsion in the bottles. The bottles are then capped and given manual agitation for a predetermined number of counts. The number of counts are determined by a survey of the agitation which can be secured in the system in which the crude oil emulsion is being used. If the emulsion requires heat for treatment, the bottles are placed in hot water bath, the length of time and temperature determined by the particular plant equipment and practice in which the particular emulsion is employed. If the plant provides for hot agitation of the emulsion the bottles may be given a corresponding amount of manual hot agitation.

The bottles are then removed from the hot water bath and the water drop, presence of the bottom settlings (B.S.) layer and color and general appearance of the oil are noted.

A thief grind-out is taken on all bottles which appear to be promising. A thief grind-out is made by preparing centrifuge tubes filled with gasoline to the 50% mark. The thief pipette is set to the proper length by adjusting the rubber stopper so that the bottom of the pipette is about ¼ inch above the oil-water level of the bottle with maximum water drop. This same setting is used for all subsequent thiefings on remaining bottles. The thiefed oil from each bottle is added to the centrifuge tube to the 100% mark, and the tube is shaken. The samples are then centrifuged for three minutes.

With certain paraffin base oils a portion of the paraffin is thrown down with the B.S. If the centrifuge tubes are heated to 150° F., the paraffin will melt and be dissolved in the gasoline-oil mixture and usually will not be thrown down again with the B.S. upon centrifuging while hot. However, occasionally the paraffin will recongeal as the tube cools during centrifuging. If this occurs, the tube is removed from the centrifuge and heated to 150° F. without shaking or disturbing the settled B.S. layer. The heated sample is then centrifuged for 15 seconds. This should give a true B.S. reading free of paraffin.

An excess chemical grind-out is then run on each centrifuge by adding several drops of a 20% solution in white gasoline or other solvent of a chemical which causes complete separation of the water and oil. With some sensitive emulsions the chemical will cause reemulsification. In these instances it is necessary to re-thief and add a lesser amount. Each tube is vigorously shaken to make sure that the B.S. layer is broken up and the tubes heated to 150° F. in the case of troublesome paraffin base crude oil. The samples are then centrifuged for three minutes.

During the test the speed of the water drop is observed carefully after the emulsion breaking chemical is added to the prescription bottles. The observation of the color and brilliance of the oil in transmitted light is very important. In general, the brilliance and depth of color increases with a decrease in B.S.&W. (bottom settlings and water) content. The observations of color are made in the oil in the prescription bottles before and after heat treatment. In the ideal treatment of crude oil emulsions the oil-water line should be a sharp, clean line without any web or sludge present. Presence of a considerable amount of sludge or web is undesirable because this foreign material will eventually go to stock in the treating plant and be reported as B.S. Traces of web or sludge, however, will disappear or be removed in the normal treating plant.

In almost all instances the thief grind-out and excess chemical grind-out readings indicate the formula that has most nearly produced crude oil free from B.S. and water. The most efficient emulsion breaking chemical is determined by the foregoing test procedure by the overall consideration of the following factors: relative speed of the breaking of the emulsion which is usually indicated by speed of water drop, color and brilliance of the oil layer, the relative absence of web or sludge at oil water line and the ability to most nearly produce treated oil that is free from B.S. and water.

In most cases it is desirable to combine the active emulsion breaking chemical with a water coalescing agent. A typical formula is as follows:

Example W
Ingredients: Parts by wt.
Composition of Example N _____ 75
Water coalescing agent _____ 13
SO$_2$ extract _____ 12

A suitable water coalescing agent is made by reacting 6000 parts of nonyl phenol with 900 parts of para-formaldehyde in the presence of 55 parts of hydrochloric acid at 95–100° C. for 5 hours, then adding 2600 parts of SO$_2$ extract at 115° C., heating to 220° C. for 1 hour and thereafter oxyethylating with about 30% by weight of ethylene oxide in the presence of 0.165% by weight of potassium hydroxide. The product is an oxyethylated resin of formaldehyde and nonyl phenol which assists in producing water coalescence.

Another suitable blend of an active emulsion breaker of the present invention and a water coalescing agent is as follows:

Example X
Ingredients: Parts by wt.
Composition of Example V _____ 78
Water coalescing agent _____ 9
Normal propyl alcohol _____ 5
SO$_2$ extract _____ 8

In Example X the water coalescing agent is prepared by reacting 4800 parts of para-secondary butyl phenol with 1200 parts of para-formaldehyde in the presence of 22 parts of hydrochloric acid and 200 parts of SO$_2$ extract at a temperature of 80–100° C., then adding 1720 parts of SO$_2$ extract, heating to remove an aqueous distillate until a temperature of 190° C. is reached, holding at 190–200° C. for 1 hour, cooling to 150° C., adding 3310 parts of SO$_2$ extract, thereafter oxypropylating with equal parts of 1,2-propylene oxide and oxyethylating with about 11% by weight of ethylene oxide in the presence of a small amount of caustic potash. The product is an oxyethylated-oxypropylated resin of butyl phenol and formaldehyde which serves as a water coalescing agent.

By way of illustrating the effectiveness of the emulsion breaking chemicals contemplated by this invention, the blend of Example W (containing the diglycidyl ether of bis-phenol-A reacted with an oxyethylated-oxybutylated butylene glycol) was tested according to the foregoing bottle testing procedure on samples of crude oil obtained from Oregon Basin Field, Wyo. The crude oil emulsion contained about 43% water. The commercial treating chemical being used on the lease and the treating chemical of Example W were both tested for comparative purposes. These treating chemicals were added at a ratio of 0.03 part of a 10% solution, as described in the foregoing procedure, to 100 parts of the emulsion fluid. The samples were agitated 3 minutes at 160° F. The observations made during the tests were recorded and are summarized in the following table.

TABLE I

| Treating chemical | Water drop | | | Thief grind-out | | Excess grind-out water. |
|---|---|---|---|---|---|---|
|  | ½ hr. | 1¼ hr. | 3 hr. | B.S. | Water |  |
| Commercial chemical | 16 | 26 | 29 | 22.0 | 4.0 | 21.0 |
| Example W | 23 | 39 | 40 | 2.3 | 1.4 | 4.2 |

It will be noted that the composition of the invention is superior to the commercial chemical.

Similar tests were made on a crude oil emulsion containing about 60% water of a 33 gravity crude oil from a lease in Cabin Creek, Wyo. The treating chemicals tested included the commercial demulsifying agent being used on the lease in addition to the treating blend of Example X at a ratio of 0.06 part of a 10% solution of the treating chemical to 100 parts of the emulsion fluid. The samples were given cold agitation for 3 minutes and hot agitation for one minute, the hot temperature being 140° F. A summary of the observations made during the test appears in the following table.

TABLE II

| Treating chemical | Water drop | | Thief grind-out | | Excess grind-out | |
|---|---|---|---|---|---|---|
|  | 30 min. | 60 min. | B.S. | Water | B.S. | Water |
| Commercial chemical | 11 | 28 | 42.0 | 1.6 | Trace | 38.0 |
| Example X | 22 | 55 | 2.2 | 1.1 | 0.2 | 2.7 |

In this case, the treating chemical of the invention contained the diglycidyl ether of bis-phenol-A reacted with an oxyethylated-oxypropylated propylene glycol and again it was superior to the commercial chemical.

The term "hydroxy-hydrocarbyl compound" as used herein means a hydrocarbon in which at least one hydrogen atom has been replaced by a hydroxy group. Thus, monohydric alcohols such as methanol, ethanol, propanol, butanol and higher homologues fall in this category. Likewise, dihydric alcohols are included within the meaning of this term, for example, 1,2-propylene glycol, 1,3-propylene glycol, 1,3-butylene glycol, 1,4-butylene glycol, amylene glycols, hexylene glycols and homologues. Similarly, glycerine and 1,2,6-hexamethylene triol are included.

The term "hydroxy hydrocarbyl ether" as used herein means a hydrocarbon in which at least one hydrogen atom has been replaced by a hydroxy group and which also contains one or more ether oxygen atoms. Thus, alkyl (methyl, ethyl, propyl, butyl, etc.) or aryl (phenyl, tolyl, etc.) ethers of glycols (ethylene glycol, 1,3-propylene glycol, 1,2-propylene glycol, 1,3-butylene glycol, triethylene glycol, tetraethylene glycol, dipropylene glycol, dibutylene glycol), or the polyglycols themselves are in this category.

Since the foregoing acceptor compounds form such a small part of the final products, a propylene glycol, for example, can be substituted for a butylene glycol in the formation of an adduct with butylene oxide or a butylene glycol can be substituted for propylene glycol in the formation of an adduct with propylene oxide. In order to obtain optimum demulsifier properties, the quantity of ethylene oxide which supplies the primary hydroxyl groups for further reaction with the epoxide of the polyphenol is more critical. The oxyethylene groups also affect the hydrophilehydrophobe balance of the final product.

In the foregoing description, the preferred diglycidyl ethers are diphenyldiglycidyl ether or a diglycidyl ether of diphenylmethane wherein the remaining substituents on the methane carbon are hydrogen or methyl.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. A substantially water-insoluble at least partially oil-soluble ether wherein said ether has the formula $$[RO_x-(C_nH_{2n+1}O)_y(CH_2CH_2O)_z]_u(R_1)_w$$

where R is a hydrocarbon a radical containing up to 12 carbon atoms; $R_1$ is the residue of a diglycidyl ether of a polyphenol selected from the group consisting of dihydroxydiphenyldimethylmethane, dihydroxydiphenylmonomethylmethane and dihydroxydiphenyl, said residue being formed upon reacting a polyether alcohol corresponding to the polyether enclosed by bracket subtended by $u$ in the formula with the said diglycidyl ether of a polyphenol $x$ is 1 to 3; $n$ is 3 to 4; $y$ is 17 to 68 when $n$ is 3 and 7 to 56 when $n$ is 4; $z$ is 0.7 to 1.1 when $n$ is 4 and $x$ is 1 to 2; $z$ is 0.4 to 0.8 when $n$ is 3 and $x$ is 1 to 2; $z$ is 0.2 to 0.5 when $n$ is 3 to 4 and $x$ is 3; $u$ is 3 to 5; and $w$ is 2 to 4.

2. The product of claim 1 in which $n$ is 3.
3. The product of claim 2 in which $x$ is 1.
4. The product of claim 1 in which $n$ is 4.
5. The product of claim 4 in which $x$ is 2.

References Cited

UNITED STATES PATENTS 2,723,241  11/1955  DeGroote et al.
3,078,271  2/1963  DeGroote et al.

BERNARD HELFIN, Primary Examiner

U.S. Cl. X.R.

260—615

PO-1050
(5/69)

UNITED STATES PATENT OFFICE
CERTIFICATE OF CORRECTION

Patent No. 3,511,882          Dated May 12, 1970

Inventor(s) Virgil L. Seale et al

It is certified that error appears in the above-identified patent and that said Letters Patent are hereby corrected as shown below:

Column 1, line 5, "Derwin" should read -- Derwin DeShazo --; lines 28-30, delete "and 1 to 3 ... carbon atoms"; line 56, "oills" should read -- oils --.

Column 2, line 26, "alcohol" should read -- alcohol, --.

Column 4, line 52, "CC." should read -- C. --.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents